United States Patent [19]

Fujita et al.

[11] Patent Number: 5,225,501
[45] Date of Patent: Jul. 6, 1993

[54] PROCESS FOR PRODUCING A PROPYLENE RANDOM COPOLYMER

[75] Inventors: Takashi Fujita; Toshihiko Sugano; Hideshi Uchino, all of Yokkaichi, Japan

[73] Assignee: Mitsubishi Petrochemical Company Limited, Tokyo, Japan

[21] Appl. No.: 877,106

[22] Filed: May 1, 1992

[30] Foreign Application Priority Data

May 2, 1991 [JP] Japan .................. 2-100991

[51] Int. Cl.$^5$ .................. C08F 2/06; C08F 4/42
[52] U.S. Cl. .................. 526/127; 526/160; 526/161; 526/170; 526/172; 526/348.2; 502/108
[58] Field of Search .................. 526/127, 160, 172

[56] References Cited

U.S. PATENT DOCUMENTS 4,874,880 10/1989 Miya et al. .................. 526/160
4,931,417 6/1990 Miya et al. .................. 526/127

FOREIGN PATENT DOCUMENTS 0347129 12/1989 European Pat. Off. .
88/04674 6/1988 World Int. Prop. O. .
91/01337 2/1991 World Int. Prop. O. .

Primary Examiner—Joseph L. Schofer
Assistant Examiner—David Wu
Attorney, Agent, or Firm—Oblon, Spivak, McClelland, Maier & Neustadt

[57] ABSTRACT

A process for producing a propylene random copolymer comprising the repeating units (I)–(III) in quantities of 70–99.9 molar % of (I), 0–15 molar % and 0.1–30 molar %, respectively, which comprises contacting monomers which afford the following repeating units:

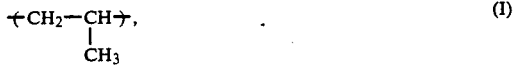

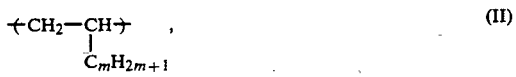

and

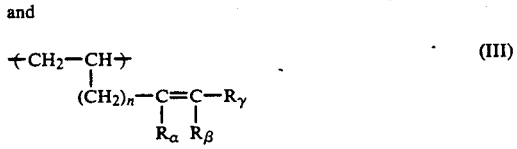

m denotes 0 or an integer of 2-10, $R_\alpha$, $R_\beta$ and $R_\gamma$ independently represent a hydrogen atom or a hydrocarbyl group having 1-5 carbon atoms, at least one of $R_\beta$ and $R_\gamma$ being the hydrocarbyl group, and n denotes an integer of 1-5, with a polymerization catalyst to copolymerize, the polymerization catalyst comprising:

component (A) which is a transition metal compound represented by the formula:

$$Q_d(C_5H_{5-a-b}R^1{}_b)(C_5H_{5-a-c}R^2{}_c)MeXY$$

wherein $R^1$ and $R^2$, respectively, represent a hydrocarbyl group having 1-20 carbon atoms, a halogen atom, an alkoxy group, a silicon-containing hydrocarbyl group, a phosphorus-containing hydrocarbyl group, a nitrogen-containing hydrocarbyl group or a boron-containing hydrocarbyl group, Q represents a bonding group crosslinking the two conjugated five-membered ring ligands, Me represents a transition metal of groups IVB–VIB in the Periodic Table, X and Y, represent hydrogen, a halogen atom, a hydrocarbyl group, an alkoxy group, an amino group, phosphorus-containing hydrocarbyl group or a silicon-containing hydrocarbyl group, respectively, a denotes 0 or 1, b denotes an integer in the range of $0 \leq b \leq 4$ and c denotes an integer in the range of $0 \leq c \leq 4$; and component (B) which is an alumoxane.

14 Claims, No Drawings

PROCESS FOR PRODUCING A PROPYLENE RANDOM COPOLYMER

BACKGROUND OF THE INVENTION

1. Technical Field

The present invention relates to a process for preparing a propylene random copolymer. More particularly, it relates to a process for preparing a random copolymer having an unsaturated hydrocarbon moiety comprising propylene and a specified diene in the presence of a specified catalyst.

2. Prior Art

It is well known in the art that propylene homopolymers or copolymers (referred to hereinafter generally as propylene polymers) are developed for their applications to the wide range of fields owing to their excellent properties.

On the other hand, it is also known that these polymers are essentially saturated hydrocarbons and thus have problems that their graft reaction or crosslinking reaction are limited because of their inferior chemical reactivities and that they are least susceptible to an adhesive, coating, printing or the like.

In order to solve the problems, a variety of inventions have been proposed (Japanese Patent Laid-Open Publications Nos. 165907/1980, 30414/1981, 36508/1981, 115007/1987, 115008/1987 and 145611/1990). These inventions relate to the copolymers of propylene and a non-conjugated diene, which are attracting attention as reactive polypropylenes because of the presence of an unsaturated double bond in the side chains.

These proposals, however, could entail problems such that a non-conjugated diene may not always have a high copolymerization reactivity and thus have a problem that an expensive non-conjugated diene compound must be used in a large amount and the copolymer is produced in a small amount as compared with the amount of the catalyst used (i.e. low catalyst activity), so that the production cost tends to become expensive. Thus, further improvements are desired.

On the other hand, it is also well known that an $\alpha$-olefin polymer is produced at a high yield in the presence of a polymerization catalyst comprising a transition metal compound having a conjugated five-membered ring ligand and an alumoxane (Japanese Patent Laid-Open Publication Nos. 19309/1984, 35007/1985, 130314/1986, 295607/1988 and 41303/1990). Also, proposals referring to a process for preparing a copolymer of propylene and a 1-olefin having 4 or more carbon atoms in the presence of these catalysts (Japanese Patent Laid-Open Publication Nos. 119212/1987, 266116/1989, 173014/1990 and 247207/1990).

The polymers obtained according to these proposals in their original forms, however, have narrow molecular weight distributions, so that their moldabilities are often deteriorated. In order to improve the moldabilities, the use of a plurality of metallocene compounds has been proposed for the broadening of the molecular weight distribution of the polymer obtained which is a mixture of polymers of different molecular weight (Japanese Patent Laid-Open Publication No. 35008/1985). However, if the polymers in the mixture produced have large difference in their molecular weights, these polymers are hardly compatible and require complicated operation controls. Therefore, it is desirable to broaden the molecular weight distribution by the polymerization in the presence of a single catalyst.

Copolymerizations of an olefin and a diene compound in the presence of a metallocene catalyst have themselves been proposed (Japanese Patent Laid-Open Publication No. 19309/1983, WO 88/04672, WO 88/04673, WO 88/04674). According to these proposals, the polymers obtained may have narrower molecular weight distributions than usual which could entail the deterioration of their moldabilities. copolymerization of propylene and a non-conjugated diene has not been proposed as far as the present inventors know.

The object of the present invention is to provide a solution to the aforementioned problems.

SUMMARY OF THE INVENTION

The process for producing a propylene random copolymer according to the present invention comprising the repeating units (I)-(III) in quantities of 70-99.9 molar % of (I), 0-15 molar % and 0.1-30 molar %, respectively, which comprises contacting monomers which afford the following repeating units:

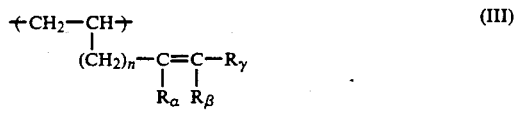

wherein m denotes 0 or an integer of 2-10, $R_\alpha$, $R_\beta$ and $R_\gamma$ independently represent a hydrogen atom or a hydrocarbyl group having 1-5 carbon atoms, at least one of $R_\beta$ and $R_\gamma$ being the hydrocarbyl group, and n denotes an integer of 1-5, with a polymerization catalyst to copolymerize, the polymerization catalyst comprising:

component (A) which is a transition metal compound represented by the formula:

wherein $(C_5H_{5-a-b}R^1{}_b)$ and $(C_5H_{5-a-c}R^2{}_c)$, respectively, represent a conjugated five-membered ring ligand coordinating to a metal Me, $R^1$ and $R^2$, respectively, represent a hydrocarbyl group having 1-20 carbon atoms, a halogen atom, an alkoxy group, a silicon-containing hydrocarbyl group, a phosphorus-containing hydrocarbyl group, a nitrogen-containing hydrocarbyl group or a boron-containing hydrocarbyl group, wherein $R^1$ and $R^2$ may be the same or different, and a plurality of $R^1$ or of $R^2$ can be bonded to each other, Q represents a bonding group crosslinking the two conjugated five-membered ring ligands, Me represents a transition metal of groups IVB-VIB in the Periodic Table, X and Y, which may be the same or different, represent hydrogen, a halogen atom, a hydrocarbyl group, an alkoxy group, an amino group, a phosphorus-containing hydrocarbyl group or a silicon-containing hydrocarbyl group, respectively, a denotes 0 or 1, b denotes an integer in the range of $0 \leq b \leq 5$ and c denotes an integer in the range of $0 \leq c \leq 5$ wherein $0 \leq a+b \leq 5$ and $0 \leq a+c \leq 0$; and component (B) which is an alumoxane.

According to the present invention, a propylene random copolymer endowed with improved susceptibility to adhesion, painting and printing or having a reactivity for easy denaturation depending on its applications can be prepared without the use of a large amount of an expensive non-conjugated diene compound and without entailing appreciable change in moldability due to the narrowing the molecular weight distribution.

DETAILED DESCRIPTION OF THE INVENTION

[I]. Polymerization catalyst

The polymerization catalyst used in the present invention comprises the Components (A) and (B). The term "comprises" means that any third component may upon necessity be present on the use of the components (A) and (B) as far as the third component will not deteriorate the effect inherent in the Components (A) and (B).

Component (A)

The component (A) is a transition metal compound represented by the formula:

$$Q_d(C_5H_{5-a-b}R^1{}_b)(C_5H_{5-a-c}R^2{}_c)MeXY,$$

wherein Q represents a bonding group or a bridge for crosslinking the two conjugated five-membered ring ligands and particularly include (a) an alkylene group having 1 – about 20 carbon atoms in total, such as a methylene group, an ethylene group, an isopropylene group, a phenylmethylmethylene group, a diphenylmethylene group, a cyclohexylene group or preferably a methylene, ethylene or propylene group, or methylene, ethylene or propylene group substituted with a hydrocarbyl group having 1 to 8 carbon atoms; (b) a mono- or oligo-silylene group which may or may not be substituted with a hydrocarbyl group having 1 – about 8 carbon atoms such as a silylene group, a disilylene group, a tetramethyldisilylene group or the like; (c) a germanium-, phosphorus-, nitrogen-, boron- or aluminum-containing hydrocarbon group having 1 about 8 carbon atoms, specifically the groups such as $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$, $(CH_3O)Al$ or the like. Preferably, Q represents an alkylene group and a silylene group. a denotes 0 or 1.

while the conjugated five-membered ring ligands represented by $(C_5H_{5-a-b}R^1{}_b)$ and $(C_5H_{5=a-c}R^2{}_c)$ are independently defined, b and c as well as $R^1$ and $R^2$ have especially the same definitions (described in detail below). Thus, it is needless to say that the conjugated five-membered ring ligands may be the same or different. One of the specific examples of the conjugated five-membered ring ligands is a cyclopentadienyl group (having no substituent except for the crosslinking group Q) wherein b=0 (or c=0). If the conjugated five-membered ring ligand has a substituent wherein b≠0 (or c≠0), one of the specific examples of $R^1$ (or $R^2$) is a hydrocarbyl group (having 1-20, preferably 1-12 carbon atoms). The hydrocarbyl group $R^1$ (or $R^2$) may be bonded as a monovalent group with a cyclopentadienyl group or, when b (or c) is 2 or more, the two $R^1$ (or $R^2$) may or may not be bonded at their terminus to form a ring. The typical example of the latter is the one wherein $R^1$ (or $R^2$) shares the double bond in the cyclopentadienyl group to form a six-membered ring fused with the cyclopentadienyl group, that is the one wherein the conjugated five-membered ring group is an indenyl group or a fluorenyl group. That is, the typical examples of the conjugated five-membered ring group include substituted or non-substituted cyclopentadienyl, indenyl and fluorenyl groups.

$R^1$ and $R^2$ represent, in addition to the aforementioned hydrocarbyl group having 1-20, preferably 1-12 carbon atoms, a halogen group such as fluorine, chlorine or bromine; an alkoxy group such as the one having 1-20 carbon atoms; a silicon-containing hydrocarbyl group such as a group containing a silicon atom in the form of —Si—(R)(R)(R) and having 1 – about 24 carbon atoms; a phosphorus-containing hydrocarbyl group such as a group containing a phosphorus atom in the form of —P—(R)(R) and having 1 – about 18 carbon atoms; a nitrogen-containing hydrocarbyl group such as a group containing a nitrogen atom in the form of —N—(R)(R) and having 1 – about 18 carbon atoms; or a boron-containing hydrocarbyl group such as a group containing a boron atom in the form of —B—(R)(R) and having 1 – about 18 carbon atoms. If b (or c) is 2 or more and the conjugated five-membered ring ligand has thus a plurality of the group $R^1$ (or $R^2$), these groups may be the same or different.

b and c denote the integers which satisfy $0 \leq b \leq 5$ and $0 \leq c \leq 5$ when a=0 and $0 \leq b \leq 4$ and $0 \leq c \leq 4$ when a=1.

Me represents a transition metal of the group IVB-VIB in the Periodic Table, preferably titanium, zirconium and hafnium.

X and Y represent, respectively, a hydrogen atom, a halogen atom, a hydrocarbyl group having 1-20, preferably 1-10 carbon atoms, an alkoxy group having 1-20, preferably 1-10 carbon atoms, an amino group, a phosphorus-containing hydrocarbyl group having 1-20, preferably 1-12 carbon atoms (specifically, such as a diphenylphosphine group) or a silicon-containing hydrocarbyl group having 1-20, preferably 1-12 carbon atoms (specifically, such as a trimethylsilyl group). X and Y may be the same or different. Among these groups, a halogen group and a hydrocarbyl group are preferred.

Specific examples of the transition metal compound when Me is zirconium include:

(a) transition metal compounds having no bonding group Q, such as:

(1) bis(cyclopentadienyl)zirconium dichloride,
(2) bis(methylcyclopentadienyl)zirconium dichloride,
(3) bis(dimethylcyclopentadienyl)zirconium dichloride,
(4) bis(trimethylcyclopentadienyl)zirconium dichloride,
(5) bis(tetramethylcyclopentadienyl)zirconium dichloride,
(6) bis(pentamethylcyclopentadienyl)zirconium dichloride,
(7) bis(indenyl)zirconium dichloride,
(8) bis(fluorenyl)zirconium dichloride,
(9) bis(cyclopentadienyl)zirconium monochloride monohydride,
(10) bis(cyclopentadienyl)methylzirconium monochloride,
(11) bis(cyclopentadienyl)ethylzirconium monochloride,
(12) bis(cyclopentadienyl)phenylzirconium monochloride,
(13) bis(cyclopentadienyl)zirconium dimethyl,
(14) bis(cyclopentadienyl)zirconium diphenyl,
(15) bis(cyclopentadienyl)zirconium dineopentyl,
(16) bis(cyclopentadienyl)zirconium dihydride,

(17) (cyclopentadienyl)(indenyl)zirconium dichloride,
(18) (cyclopentadienyl)(fluorenyl)zirconium dichloride;

(b) transition metal compounds having five-membered ring ligands crosslinked with an alkylene group, such as:

(1) methylenebis(indenyl)zirconium dichloride,
(2) ethylenebis(indenyl)zirconium dichloride,
(3) ethylenebis(indenyl)zirconium monohydride monochloride,
(4) ethylenebis(indenyl)methylzirconium monochloride,
(5) ethylenebis(indenyl)zirconium monomethoxymonochloride,
(6) ethylenebis(indenyl)zirconium diethoxide,
(7) ethylenebis(indenyl)zirconium dimethyl,
(8) ethylenebis(4,5,6,7-tetrahydroindenyl)zirconium dichloride,
(9) ethylenebis(2-methylindenyl)zirconium dichloride,
(10) ethylene(2,4-dimethylcyclopentadienyl)-(3', 5'-dimethylcyclopentadienyl)zirconium dichloride,
(11) ethylene(2-methyl-4-tert-butylcyclopentadienyl)-(3'-tert-butyl-5'-methylcyclopentadienyl)zirconium dichloride,
(12) ethylene(2,3,5-trimethylcyclopentadienyl)-(2',4',5'-trimethylcyclopentadienyl)zirconium dichloride,
(13) isopropylidenebis(indenyl)zirconium dichloride,
(14) isopropylidenebis(2,4-dimethylcyclopentadienyl)-(3', 5'-dimethylcyclopentadienyl)zirconium dichloride,
(15) isopropylidenebis(2-methyl-4-tert-butylcyclopentadienyl) (3'-tert-butyl-5-methylcyclopentadienyl)zirconium dichloride,
(16) methylene(cyclopentadienyl)(3,4-dimethylcyclopentadienyl)zirconium dichloride,
(17) methylene(cyclopentadienyl)(3,4-dimethylcyclopentadienyl)zirconium dihydride,
(18) methylene(cyclopentadienyl)(3,4-dimethylcyclopentadienyl)zirconium dimethyl,
(19) methylene(cyclopentadienyl)(3,4-dimethylcyclopentadienyl)zirconium diphenyl,
(20) methylene(cyclopentadienyl)-(trimethylcyclopentadienyl)zirconium dichloride,
(21) methylene(cyclopentadienyl)-(tetramethylcyclopentadienyl)zirconium dichloride,
(22) isopropylidene(cyclopentadienyl)-(3,4-dimethylcyclopentadienyl)zirconium dichloride,
(23) isopropylidene(cyclopentadienyl)(2,3,4,5-tetramethylcyclopentadienyl)zirconium dichloride,
(24) isopropylidene(cyclopentadienyl)-(3-methylindenyl)zirconium dichloride,
(25) isopropylidene(cyclopentadienyl)(fluorenyl)zirconium dichloride,
(26) isopropylidene(2-methylcyclopentadienyl)(-fluorenyl)zirconium dichloride,
(27) isopropylidene(2,5-dimethylcyclopentadienyl)-(3,4-dimethylcyclopentadienyl)zirconium dichloride,
(28) isopropylidene(2,5-dimethylcyclopentadienyl)-(fluorenyl)zirconium dichloride,
(29) ethylene(cyclopentadienyl(3,5-dimethylcyclopentadienyl)zirconium dichloride,
(30) ethylene(cyclopentadienyl)(fluorenyl)zirconium dichloride,
(31) ethylene(2,5-dimethylcyclopentadienyl)-(fluorenyl)zirconium dichloride,
(32) ethylene(2,5-diethylcyclopentadienyl)-(fluorenyl)zirconium dichloride,
(33) diphenylmethylene(cyclopentadienyl)-(3,4-dimethylcyclopentadienyl)zirconium dichloride,
(34) diphenylmethylene(cyclopentadienyl)-(3,4-diethylcyclopentadienyl)zirconium dichloride,
(35) cyclohexylidene(cyclopentadienyl)-(fluorenyl)zirconium dichloride,
(36) cyclohexylidene(2,5-dimethylcyclopentadienyl)-(3',4'-dimethylcyclopentadienyl)zirconium dichloride;

(c) transition metal compounds having five-membered ring ligands crosslinked with a silylene group, such as:

(1) dimethylsilylenebis(indenyl)zirconium dichloride,
(2) dimethylsilylene(4,5,6,7-tetrahydroindenyl)zirconium dichloride,
(3) dimethylsilylene(2,4-dimethylcyclopentadienyl)-(3',5'-dimethylcyclopentadienyl)zirconium dichloride,
(4) phenylmethylsilylenebis(indenyl)zirconium dichloride,
(5) phenylmethylsilylenebis(4,5,6,7-tetrahydroindenyl)zirconium dichloride,
(6) dimethylsilylene(2-methylindenyl)zirconium dichloride,
(7) phenylmethylsilylene(2,4-dimethylcyclopentadienyl)-(3',5'-dimethylcyclopentadienyl)zirconium dichloride,
(8) phenylmethylsilylene(2,3,5-trimethylcyclopentadienyl) (2,4,5-trimethylcyclopentadienyl)zirconium dichloride,
(9) phenylmethylsilylenebis(tetramethylcyclopentadienyl)zirconium dichloride,
(10) diphenylsilylenebis(indenyl)zirconium dichloride,
(11) tetramethylsilylenebis(indenyl)zirconium dichloride,
(12) tetramethylsilylenebis(cyclopentadienyl)zirconium dichloride,
(13) tetramethyldisilylene(3-methylcyclopentadienyl)-(indenyl)zirconium dichloride,
(14) dimethylsilylene(cyclopentadienyl(3,4-dimethylcyclopentadienyl)zirconium dichloride,
(15) dimethylsilylene(cyclopentadienyl)-(trimethylcyclopentadienyl)zirconium dichloride,
(16) dimethylsilylene(cyclopentadienyl)-(tetramethylcyclopentadienyl)zirconium dichloride,
(17) dimethylsilylene(cyclopentadienyl)-(3,4-diethylcyclopentadienyl)zirconium dichloride,
(18) dimethylsilylene(cyclopentadienyl)-(triethylcyclopentadienyl)zirconium dichloride,
(19) dimethylsilylene(cyclopentadienyl)-(tetraethylcyclopentadienyl)zirconium dichloride,
(20) dimethylsilylene(cyclopentadienyl)(fluorenyl)-zirconium dichloride,
(21) dimethylsilylene(cyclopentadienyl)-(2,7-di-t-butylfluorenyl)zirconium dichloride,
(22) dimethylsilylene(cyclopentadienyl)-(octahydrofluorenyl)zirconium dichloride,
(23) dimethylsilylene(2-methylpentadienyl)-(fluorenyl)-zirconium dichloride,
(24) dimethylsilylene(2,5-dimethylcyclopentadienyl)-(fluorenyl)zirconium dichloride,
(25) dimethylsilylene(2-ethylcyclopentadienyl)-(fluorenyl)zirconium dichloride,
(26) dimethylsilylene(2,5-diethylcyclopentadienyl)-(fluorenyl)zirconium dichloride,
(27) dimethylsilylene(2-methylcyclopentadienyl)-(2,7-di-t-butylfluorenyl)zirconium dichloride,

(28) dimethylsilylene(2,5-dimethylcyclopentadienyl)-(2,7-di-t-butylfluorenyl)zirconium dichloride,
(29) dimethylsilylene(2-ethylcyclopentadienyl)-(2,7-di-t-butylfluorenyl)zirconium dichloride,
(30) dimethylsilylene(diethylcyclopentadienyl)-(2,7-di-t-butylfluorenyl)zirconium dichloride,
(31) dimethylsilylene(methylcyclopentadienyl)-(octahydrofluorenyl)zirconium dichloride,
(32) dimethylsilylene(dimethylcyclopentadienyl)-(octahydrofluorenyl)zirconium dichloride,
(33) dimethylsilylene(ethylcyclopentadienyl)-(octahydrofluorenyl)zirconium dichloride,
(34) dimethylsilylene(diethylcyclopentadienyl)(octahydrofluorenyl)zirconium dichloride;

(d) transition metal compounds having five-membered ring ligands crosslinked with a germanium-, aluminum-, boron-, phosphorus- or nitrogen-containing hydrocarbyl group, such as:
(1) dimethylgermaniumbis(indenyl)zirconium dichloride,
(2) dimethylgermaniumbis(cyclopentadienyl)(fluorenyl)zirconium dichloride,
(3) methylaluminumbis(indenyl)zirconium dichloride,
(4) phenylaluminumbis(indenyl)zirconium dichloride,
(5) phenylphosphinobis(indenyl)zirconium dichloride,
(6) ethylboranobis(indenyl)zirconium dichloride,
(7) phenylaminobis(indenyl)zirconium dichloride,
(8) phenylaminobis(cyclopentadienyl)(fluorenyl)zirconium dichloride.

(e) The aforementioned compounds (a)-(d) in which chlorine is replaced with bromine, iodine, hydride, methyl, phenyl or the like can also be used.

In the present invention, the zirconium compounds illustrated in the aforementioned (a)-(d) in which zirconium as the central metal is replaced with titanium, hafnium, niobium, molybdenum or wolfram can also be used as the component (A).

Among these compounds, preferred ones are the zirconium compounds, the hafnium compounds and the titanium compounds, and more preferably ones are the zirconium compounds and the hafnium compounds crosslinked with an alkylene group or a silylene group.

Component (B)

The component (B) is an alumoxane. An alumoxane is a product obtained by the reaction of a trialkylaluminum or two or more trialkylaluminums with water. The alkyl group has preferably 1 - about 6 carbon atoms. Specific examples include methylalumoxane, ethylalumoxane, butylalumoxane, isobutylalumoxane and the like which are obtained from a trialkylaluminum; and methylethylalumoxane, methylbutylalumoxane, methylisobutylalumoxane and the like which are obtained from two trialkylaluminums and water. Two or more of these alumoxanes can be used in combination, and they can be also used in combination with an alkylaluminum compound such as trimethylaluminum, triethylaluminum, triisobutylaluminum, dimethylaluminum chloride or the like. Modified alumoxanes such as those obtained by the reaction of two alumoxane or the reaction of an alumoxane with another organoaluminum compound can also be used. Among these alumoxanes, methylalumoxane, isobutylalumoxane, methylisobutylalumoxane and mixtures of these alumoxanes with a trialkylaluminum are preferably used. The more preferred ones are methylalumoxane and methylisobutylalumoxane.

These alumoxanes may be prepared under a variety of well-known conditions. Specifically, there can be mentioned the following methods:

(a) a method of directly reacting a trialkylaluminum with water in the presence of an appropriate organic solvent such as toluene, benzene, ether or the like, (b) a method of reacting a trialkylaluminum with a salt hydrate containing water of crystallization such as a hydrate of copper sulfate or of aluminum sulfate, (c) a method of reacting a trialkylaluminum with water impregnated into silica gel or the like, (d) a method of mixing trimethylaluminum and triisobutylaluminum and directly reacting the mixture with water in the presence of toluene, benzene, ether or the like, (e) a method of mixing trimethylaluminum and triisobutylaluminum and reacting under heating the mixture with a salt hydrate having water of crystallization such as a hydrate of copper sulfate or aluminum sulfate, (f) a method of treating silica gel or the like with impregnated water with triisobutylaluminum and treating the product additionally with trimethylaluminum, and (g) a method of synthesizing methylalumoxane and isobutylalumoxane by a well-known method, mixing these two alumoxanes in a prescribed ratio and reacting the mixture by heating.

Formation of catalyst

The catalyst in the present invention can be obtained by contacting the aforementioned Components (A) and (B) within or in the outside of a polymerization vessel in the presence or absence of a monomer to be polymerized.

Any amounts of the Components (A) and (B) can be used in the present invention, but the atomic ratio of the aluminum atom in the Component (B) and the transition metal in the Component (A), Al/Me, is generally in the range of 0.01-100,000, preferably 0.1-30,000. Any methods for contacting the Components (A) and (B) can be employed. The Components (A) and (B) may be separately introduced into the polymerization vessel for contact on polymerization, or the Components (A) and (B) which have been preliminarily contacted with each other may also be used.

The catalyst according to the present invention, as described above, can contain other components in addition to the Components (A) and (B). As the third component (optional component) which can be added to the Components (A) and (B), there can be mentioned active hydrogen-containing compounds such as $H_2O$, methanol, ethanol and butanol; electron-donating compounds such as ethers, esters and amines; and alkoxy-containing compounds such as diphenyl borate, dimethylmethoxyaluminum, phenyl phosphite, tetraethoxysilane or diphenyldimethoxysilane.

[II]. Preparation of random copolymers

As described above in detail, the monomers which afford the repeating units (I) and (III), that is propylene and a non-conjugated branched diene liquefied represented by the formula: $CH_2=CH-(CH_2)_n-C(R_\alpha)=C(R_\beta)-R_\gamma$ (referred to hereinafter as non-conjugated branched diene), and optionally an α-olefin represented by the formula $CH_2=CH-C_mH_{2m+1}$; that is ethylene (m=0) or an α-olefin having 4-12 carbon atoms (m=2-10) (referred to hereinafter as α-olefin), are contacted in admixture with the catalyst to give a random copolymer of the present invention. The amount ratio of respective monomers in the system is not necessarily constant with the passage of time, and it may be convenient to supply the monomers in a constant mixing ratio or, alternatively, it is also possible to change the mixing ratio of the monomers to be supplied with the passage of time. Further, either one of the monomers, particularly the non-conjugated branched diene, can be added in portions in consideration of the copolymerization reaction rate.

As the non-conjugated branched diene, 4-methyl-1,4-hexadiene, 5-methyl-1,4-hexadiene, 5-methyl 1,4-heptadiene, 5-methyl-1,5-heptadiene, 6-methyl-1,5-heptadiene, 5-methyl-1,5-octadiene, 6-methyl-1,5-octadiene, 6-methyl-1,6-octadiene, 5,6-dimethyl-1,6-octadiene, 7-methyl-1,6-octadiene, 7-methyl-1,6-nonadiene, 7-methyl-1,6-decadiene, 7-ethyl-1,6-decadiene or the like can be used alone or as a mixture of the two or more by supplying it to the system. Particularly, it may be advantageous to use a single species of a non-conjugated branched diene for the ease of control of the reactivity. Preferable non-conjugated branched diene is 5-methyl-1,4-hexadiene or 7-methyl-1,6-octadiene.

As the α-olefin used according to the necessities, there are mentioned ethylene, 1-butene, 1-pentene, 3-methyl-butene-1, 1-hexene, 4-methylpentene-1, 1-heptene, 1-octene, 1-nonene, 1-decene and the like, which can be used alone or as a mixture of the two or more by supplying it to the system. Among them, the α-olefin is preferably a linear α-olefin, more preferably an α-olefin wherein m denotes 0 or 2–4, specifically ethylene, 1-butene and 1-hexene.

Any polymerization modes can be employed provided that an effective contact of the catalyst components with the monomers are secured. Specifically, a slurry method in which an inert solvent is used; a slurry method in which substantially no inert solvent is used and propylene and the non-conjugated branched diene liquefied are used as the solvents; a solution polymerization method or a gas phase polymerization method in which substantially no liquid solvent is used and the monomers are kept substantially in a gas state, can be employed. These modes can be practiced in continuous polymerization, in batchwise polymerization or in a method in which preliminary polymerization is included.

As the polymerization solvents in the slurry polymerization, saturated aliphatic or aromatic hydrocarbons such as hexane, heptane, pentane, cyclohexane, benzene or toluene are employed alone or as a mixture thereof. Polymerization temperature is in the range of −78° C. - about 200° C., preferably 0° C. - 150° C., and hydrogen can be used as an additive for molecular weight regulator. In the slurry polymerization, the component (A) is preferably used in the range of 0.0001–1.0 g of component (A)/liter of solvent.

Polymerization pressure is in the range of 0–90 kg/cm$^2$G, preferably in the range of 0–60 kg/cm$^2$G, more preferably 1–50 kg/cm$^2$G.

For the purpose of improvement of the catalyst activity, the suppression of formation of any solvent-soluble polymers as the by-products or the prevention of lowering of the melting point of the polymer used, it is also preferred to use a catalyst which has undergone preliminary polymerization in which the catalyst is subjected to homopolymerization of propylene prior to the copolymerization. In this connection, it is sufficient that the amount of the propylene homopolymer produced amounts to the range of 10% by weight or less, preferably 5% by weight or less to the total amount of polymers produced in the copolymerization. Preferably, the amount of the propylene homopolymer is such that no DSC peaks based on the propylene homopolymer are observed in the polymers produced in the copolymerization.

The preliminary polymerization, namely homopolymerization of propylene, is generally conducted at a temperature same as or lower than the temperature at which the copolymerization is then conducted. Thus, the temperature of the homopolymerization of propylene is in the range of −30°–(+)70° C., preferably 0°–50° C. The reaction can be conducted generally at a pressure in the range from atmospheric pressure to 20 kg/cm$^2$G, preferably from atmospheric pressure to 5 kg/cm$^2$G, but the pressure is not necessarily limited to the above-mentioned range provided that the amount of the propylene homopolymer in the copolymer finally produced remains within the aforementioned range.

The molecular weight of the copolymer can be controlled by the addition of hydrogen to the polymerization system.

[III]. Copolymer produced (1) Composition

The copolymer obtained according to the present invention is a random copolymer and comprises 70–99.9 molar %, preferably 87–99.9 molar %, of the repeating unit derived from propylene (I), that is,

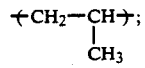

0–15 molar %, preferably 0–8 molar %, of the repeating unit derived from the α-olefin (II), that is,

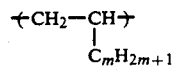

wherein m denotes an integer of 2–10; and 0.1–30 molar %, preferably 0.1–15 molar %, of the repeating unit derived from the non-conjugated branched diene (III), that is,

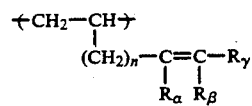

wherein $R_\alpha$, $R_\beta$ and $R_\gamma$ independently represent a hydrogen atom or a hydrocarbyl group having 1–5 carbon atoms, at least one of $R_\beta$ and $R_\gamma$ being a hydrocarbyl group, and n denotes an integer of 1–5. In this connection, the term "comprises" means that appropriate other components except the aforementioned three components or other components which are inevitably contained in the random copolymer together with the three components can be contained. Also, the copolymer according to the present invention is a random copolymer and thus comprises the random or statistic sequence of the repeating units (I)–(III).

If the propylene unit is in an amount of less than 70 molar %, the copolymer may have such a low crystallinity that it may something rubber-like material. On the other hand, if the unit exceeds 99.9 molar %, the content of the non-conjugated branched diene unit is so low that the reactivity of the copolymer based on the unsaturated bond pendent at the chain which is intended by the present invention is not exhibited sufficiently.

When a plurality of the non-conjugated branched diene is used, the unit of the non-conjugated branched diene is represented as the sum of these dienes used. If the non-conjugated branched diene unit is in an amount less than 0.1 molar %, satisfactory reactivity may be obtained by the same reason as above. On the other hand, if the amount of the non-conjugated branched diene unit exceeds 30 molar %, crystallinity of the copolymer produced is undesirably lowered.

In the present invention, the α-olefin unit of (II) is optionally introduced for controlling or improving the physical properties required of the copolymer according to its applications such as transparency, flexibility, melting point according to necessities. Thus, the content of the α-olefin unit is appropriately determined depending on the situations such as the applications of the copolymer. However, if the content of the ethylene unit exceeds 15 molar %, the copolymer having a satisfactory crystallinity may not generally be obtained.

Thus, the copolymer preferably has a composition of 87-99.5 molar % of the propylene unit, 0-8 molar % of the α-olefin unit and 0.1-8 molar % of the non-conjugated branched diene unit, more preferably 90-99 molar % of the propylene unit, 0.5-6 molar % of the α-olefin unit and 1-6 molar % of the non-conjugated branched diene unit.

(2) Molecular weight

The molecular weight of the copolymer of the present invention is a molecular weight which corresponds to a melt flow rate (MFR) measured at a load of 2.16 kg at a temperature of 230° C. in accordance with JIS K-6758 in the range of 0.01-1000 g/10 min, preferably 0.02-300 g/10 min, more preferably 0.05-200 g/10 min. If the MFR is less than the above-mentioned range, molding or fabrication of the copolymer is difficult. If the MFR exceeds the range, physical properties are lowered excessively. Thus, the copolymer having an MFR in the either range is not preferred.

(3) Molecular weight distribution

The molecular weight distribution, a ratio of a weight-average molecular weight, $M_w$, to a number-average molecular weight, $M_n$, ($M_w/M_n$), of the copolymer according to the present invention measured by gel permeation chromatography, GPC, is in the range of 2.0-7, preferably 2.5-6.0, more preferably 3.0-5.0. When the molecular weight distribution is in the range of 2.0 or less, the moldability is undesirably deteriorated. In this connection, the measurement of the molecular weight distribution of the copolymer by gel permeation chromatography (GPC) was carried out in accordance with "Gel Permeation Chromatography" by Takeuchi, published from Maruzen. More particularly, a standard polystyrene having a known molecular weight (monomodal polystyrene manufactured by TOSO Co., Japan) is used and from the data obtained the number-average molecular weight ($M_n$) and the weight-average molecular weight ($M_w$) are obtained by the universal method to calculate the value of $M_w/M_n$. The measurement was conducted with a chromatography apparatus 150C-ALC/GPC manufactured by Waters Co. equipped with three columns of AD80 M/S manufactured by Showa Denko Co. Samples were diluted with o-dichlorobenzene to a concentration of 0.2% by weight and used in an amount of 200 μl, and chromatography was conducted at 140° C. and at the flow rate of 1 ml/minute.

(4) Melting point

The melting point of the copolymer of the present invention is represented as a peak temperature of melting in DSC, which is in the range of 60°-160° C., preferably 90° C.-155° C., more preferably 100° C.-150° C. The copolymer having a melting point less than the abovedescribed range is not preferable, because the copolymer may not exhibit resistance to heat which is characteristic of a propylene resin and may thus be a rubber-like substance.

(5) Crystallinity

The crystallinity of the copolymer according to the present invention measured by the X-ray diffraction method is in the range of 10% by weight or more, preferably in the range of 20-55% by weight. If the copolymer has a crystallinity less than the abovedescribed range, the copolymer may not exhibit resistance to heat which is characteristic of a propylene resin.

The following Examples and Comparative Examples are given only for describing the present invention in more detail.

Polymerization used in these runs is slurry polymerization, but the present invention is not restricted to this particular polymerization mode.

The determination of factors used in these runs is in accordance with the following methods.
(1) MFR (230° C./2.16 kg)
  JIS K-6785 [g/10 min.]
(2) Crystallinity
  X Ray diffraction
(3) Melting point
  DSC, the peak value [°C.]
(4) Comonomer analysis
  $1_{H-NMR}$ [mole %]
  $13_{-NMR}$ [mole % and stereoregularity mm]

EXAMPLE 1

Preparation of component (A)

Ethylenebis(indenyl)zirconium dichloride was synthesized in accordance with the procedure described in J. Orgmet. Chem. (288) 63-67 (1985).

Preparation of component (B)

To 565 ml of a solution of 48.2 g of trimethylaluminum in toluene was added 50 g of copper sulfate pentahydride in 5 g portions at 0° C. with stirring at intervals of 5 minutes. After the addition was completed, the mixture was warmed slowly to 25° C. at which reaction was carried out for 2 hours and then for 2 days at 35° C. The residual solid copper sulfate was separated to obtain a solution of alumoxane in toluene with a methylalumoxane content of 27.3 mg/ml (2.7 w/v%).

Preparation of Copolymer

Into a 1.0-liter (inside capacity) stainless steel autoclave with a stirrer and a temperature controller were introduced 400 ml of thoroughly dehydrated and deoxygenated toluene, 10 ml of 7-methyl-1,6-octadiene, 3 mmol, as aluminum atoms, of methylalumoxane and 0.418 mg (0.001 mmol) of ethylenebis(indenyl)zirconium dichloride, and polymerization was carried out at a propylene pressure of 5 Kg/cm$^2$G and a temperature of 30° C. for 2 hours.

After completion of the polymerization, 3 liters of the reaction solution was poured into methanol and the polymer formed was separated by filtration and dried to collect 48 g of a polymer which was found by gel permeation chromatography to have a number average molecular weight (Mn) of 22.6×10$^3$, the molecular weight distribution of the polymer being 3.11 based on the weight average/number average molecular weight ratio. According to the measurement of $^{13}$C-NMR by JEOL. FX-200, the triad [mm] fraction was 0.910.

Methyl octadiene content: 2.1 mol %
MFR: 86 g/10 min.
m.p. (DSC): 118° C.
Crystallinity (X-ray diffractometry): 30.5% by weight

EXAMPLE 2

Preparation of Component (A)

Dimethylsilylenebis(tetrahydroindenyl)zirconium dichloride was synthesized in accordance with the procedures described in J. Orgmet. Chem. (342) 21-29 (1988) and J. Orgmet. Chem. (369) 359-370 (1989).

More specifically, to 5.4 g of bis(indenyl)dimethylsilane, diluted with 150 ml of tetrahydrofuran and cooled to a temperature of −50° C. or lower in a 300-ml flask purged with nitrogen, was added 23.6 ml of n-butyllithium (1.6 M/L) dropwise over 30 minutes. After completion of the addition, the mixture was warmed to room temperature over 1 hour at which reaction was carried out for 4 hours to prepare reaction solution A.

To 200 ml of tetrahydrofuran, cooled to a temperature of −50° C. or lower in a 500-ml flask purged with nitrogen, was slowly added 4.38 g of zirconium tetrachloride. Subsequently, the reaction solution A was introduced in to, and the mixture was warmed slowly to room temperature at which reaction was carried out for 2 hours and then for another 2 hours at 60° C.

After completion of the reaction, the solvent was removed by distillation under reduced pressure and the residue dissolved in 100 ml of toluene. Upon redistillation of toluene, 3.86 g of dimethylsilylenebis(indenyl)zirconium dichloride was obtained as crude crystals.

The crude crystals dissolved in 150 ml of dichloromethane were introduced into a 500-ml autoclave and 5 g of a platinum on carbon catalyst, the platinum content being 0.5% by weight, was added. The solution was then subjected to hydrogenation reaction at a hydrogen pressure of 50 Kg/cm$^2$G and a temperature of 50° C. for 5 hours.

After completion of the reaction, the catalyst was filtered off and the solvent removed by distillation under reduced pressure. The residue was extracted with toluene and subsequently recrystallized to obtain 1.26 g of dimethylsilylenebis(tetrahydroindenyl)zirconium dichloride.

Preparation of Component (B)

Into a 1,000-ml flask with a stirrer and a reflux condenser which had been thoroughly purged with nitrogen was introduced 100 ml of dehydrated and deoxygenated toluene. Then were introduced 0.72 g (10 mmol) of trimethylaluminum and 1.96 g (10 mmol) of triisobutylaluminum dissolved in 50 ml of toluene into one of the dropping funnels and water saturated toluene into the other. The aluminum mixture solution and the water saturated toluene were fed into the flask at 30° C. over 3 hours in an Al:H$_2$O molar ratio of 1:1. The mixture was then heated to 50° C. and subjected to reaction for 2 hours. Upon removal of the solvent under reduced pressure, 1.9 g of a white solid was obtained.

Preparation of Copolymer

Polymerization was conducted under the same conditions as in the preparation of the copolymer in Example 1 except that 0.46 mg of dimethylsilylenebis(tetrahydroindenyl)zirconium dichloride and 3 mmol, as aluminum atoms, of methylisobutylalumoxane prepared above were used as catalyst components. The results are shown in Table 1.

EXAMPLE 3

Preparation of component (A)

Preparation of isopropylidene(cyclopentadienyl)(fluorenyl)zirconium dichloride

To 200 ml of THF and 16.5 g of fluorene cooled to a temperature of −50° C. or lower in a 500-ml flask thoroughly purged with nitrogen was added 67 ml of a dil. methyllithium diethyl ether solution (1.4 M) dropwise over 30 minutes. The mixture was warmed gradually to room temperature and subjected to reaction for 3 hours. The reaction mixture was cooled back to a temperature of −50° C. or lower and 10 g of 6,6-dimethylfulvene was added dropwise over 30 minutes. After the addition was completed, the solution was warmed slowly to room temperature and subjected to reaction for 2 days. The reaction was terminated by the addition of 60 ml of H$_2$O, and the ether layer was separated and dehydrated over anhydrous MgSO$_4$. Drying ether by evaporation, gave 17.6 g of 2-cyclopentadienyl-2-fluorenylpropane as crude crystals.

To 10 g of the crude crystals dissolved in 100 ml of THF and cooled to a temperature of −50° C. or lower was added 46.0 ml (0.0736 mol) of n-butyllithium dropwise over 10 minutes. The mixture was warmed to room temperature over 1 hour and subjected to reaction for 2 hours. After the solvent was evaporated and the reaction solution was dried, 100 ml of dichloromethane was added under nitrogen and the mixture was cooled to a temperature of −50° C. or lower. A solution of 8.16 g of zirconium tetrachloride in 50 ml of dichloromethane separately prepared at a low temperature was added all at once. After stirring, the solution was warmed slowly over 3 hours and subjected to reaction overnight at room temperature.

After completion of the reaction, a solid formed was removed by filtration and the filtrate concentrated and recrystallized to obtain 4.68 g of red isopropylidene(cyclopentadienyl)(fluorenyl)zirconium dichloride.

Preparation of Copolymer

Polymerization was conducted under the same conditions as in Example 2 except that 0.43 mg of isopropylidene(cyclopentadienyl)(fluorenyl)zirconium dichloride prepared above was used. The results are shown in Table 1.

COMPARATIVE EXAMPLE 1

A copolymer was prepared under the same conditions as in Example 1 except that 0.2 g of the supported catalyst disclosed in Example 1 of Japanese Patent Laid-Open Pub. No. 145611/1990 and 0.25 g of triethylaluminum were used in lieu of components (A) and (B) used, respectively. The results are set forth in Table 1.

COMPARATIVE EXAMPLE 2

Polymerization was carried out as in Comparative Example 1 except that the temperature was elevated to 65° C. and that 100 Nml of hydrogen was added. The results are set forth in Table 1.

COMPARATIVE EXAMPLE 3

Polymerization was carried out as in Example 2 except that 10 ml of the 7-methyl-1,6-octadiene was replaced with an equivalent amount of 1-hexene. The results are presented in Table 1.

EXAMPLES 4–6

Preparation of Copolymer

Polymerization was carried out at 50° C. and a propylene pressure of 5 Kg/cm$^2$G for 1 hour wherein 400 ml of n-heptane was substituted for toluene as a solvent, 7-methyl-1,6-octadiene was used in amounts of 5 ml, 10 ml and 20 ml, and 0.46 mg of dimethylsilylenebis(tetrahydroindenyl)zirconium dichloride and 5 mmol, as aluminum atoms, of methylisobutylalumoxane obtained in Example 2 were employed. After completion of the polymerization, the product polymer was subjected to the same post-treatments as in Example 1. The results are summarized in Table 2.

EXAMPLES 7

Preparation of Copolymer

Polymerization was conducted as in Example 5 except that 10 ml of the 7-methyl-1,6-octadiene was replaced with an equivalent amount of 5-methyl-1,4-hexadiene. The results are shown in Table 2.

EXAMPLES 8

Preparation of Copolymer

Presented in Table 2 are the results of the polymerization carried out under the same conditions as in Example 5 except that 10 ml of 1-hexene was further added.

EXAMPLES 9

Preparation of Copolymer

Polymerization was carried out as in Example 5 wherein three components were subjected to copolymerization while ethylene was continuously fed into a polymerization vessel at a flow rate of 30 Nml/min. The results are shown in Table 2.

TABLE 1

| | Component (A) | Component (B) | Catalytic activity (g polymer/g component (A)) | MFR (g/10 min.) | GPC Mn ×10$^8$ | GPC Q (Mw/Mn) | Non-conjugated branched chain diene content (mol %) | Stereo-specificity [mm] or [rr] | Melting point (°C.) | X-Ray crystallinity (%) | Remarks |
|---|---|---|---|---|---|---|---|---|---|---|---|
| Example-1 | Ethylenebis-(indenyl)-zirconium dichloride (0.001 mmol) | Methyl-alumoxane (3 mmol) | 114,300 | 86 | 22.6 | 3.54 | 2.1 | 0.91 | 118 | 30.5 | |
| Example-2 | Dimethyl-silylenebis-(tetrahydro-indenyl)-zirconium dichloride (0.001 mmol) | Methyl-isobutyl alumoxane (3 mmol) | 145,600 | 75 | 21.5 | 3.66 | 1.6 | 0.93 | 131 | 34.5 | |
| Example-3 | Isopropyl-idene(cyclo-pentadienyl)(fluorenyl)-zirconium dichloride (0.001 mmol) | Methyl-isobutyl alumoxane (3 mmol) | 29,500 | 3.1 | 75.3 | 4.26 | 2.5 | [rr] 0.86 | 115 | 26.0 | |
| Comparative Example-1 | Component (A) of Ex. 1 of Jap. Pat. Laid-Open Pub. No. 145611/1990 (0.2 g) | Triethyl-aluminum (2.2 mmol) | 60 | 15.5 | 76.8 | 6.65 | 0.20 | 0.92 | 157 | 40.6 | |
| Comparative Example-2 | Component (A) of Ex. 1 of Jap. Pat. Laid-Open Pub. No. 145611/1990 (0.2 g) | Triethyl-aluminum (2.2 mmol) | 4,300 | 3.6 | 121.0 | 3.37 | 0.26 | 9.94 | 157 | 42.1 | Polymerized at 65° C. |
| Comparative Example-3 | Dimethyl-silylenebis-(tetrahydro-indenyl)-zirconium dichloride (0.001 mmol) | Methyl-isobutyl alumoxane (3 mmol) | 150,300 | 110 | 23.7 | 2.06 | 1-Hexene 1.8 | 0.92 | 128 | 32.5 | |

TABLE 2

| | α-Olefins (mol) | Non-conjugated diene Species & Amount | Catalytic activity (g polymer/-g component (A)) | MFR (g/10 min.) | GPC Mn ×10³ | GPC Q (Mw/Mn) | α-Olefin content (mol %) | Non-conjugated branched chain diene content (mol %) | Stereo specificity [mm] | Melting point (°C.) | X-Ray crystallinity (%) |
|---|---|---|---|---|---|---|---|---|---|---|---|
| Example-4 | — | 7-Methyl-1,6-octadiene 5 ml | 227,000 | 120 | 11.5 | 3.11 | — | 0.9 | 0.26 | 132 | 34.0 |
| Example-5 | — | 7-Methyl-1,6-octadiene 10 ml | 255,000 | 105 | 10.3 | 3.69 | — | 1.9 | 0.85 | 122 | 30.0 |
| Example-6 | — | 7-Methyl-1,6-octadiene 20 ml | 211,000 | 95 | 11.6 | 4.59 | — | 3.1 | 0.82 | 110 | 23.0 |
| Example-7 | — | 5-Methyl-1,4-hexadiene 10 ml | 153,000 | 112 | 10.0 | 3.16 | — | 2.0 | 0.85 | 120 | 32.1 |
| Example-8 | 1-hexene 10 ml | 7-Methyl-1,6-octadiene 10 ml | 231,000 | 155 | 9.8 | 3.30 | 2.0 | 1.8 | 0.83 | 104 | 21.0 |
| Example-9 | ethylene 2.2 g | 7-Methyl-1,6-octadiene 10 ml | 295,000 | 120 | 9.5 | 3.55 | 2.9 | 1.7 | 0.82 | 100 | 20.5 |

EXAMPLE 10

Preparation of Component (A)

Into a 300-ml flask purged with nitrogen were introduced 100 ml of dehydrated and deoxygenated diethyl ether and 1.37 g (3 mM) of dimethylsilylene[4,5,6,7-tetrahydroindenyl]zirconium dichloride prepared in Example 2. The mixture was cooled to a temperature of −50° C. or lower and 3.8 ml (6 mM) of a solution of methyllithium (1.6 M/L) in diethyl ether was added dropwise at this temperature over 10 minutes. The resulting solution was maintained at a temperature of −50° C. or lower for 1 hour and then warmed to room temperature over 2 hours at which reaction was carried out for 6 hours. After the reaction was completed, the solvent was removed by distillation under reduced pressure. Subsequently, 50 ml of toluene was added and the insolubles were filtered off. The reaction solution was then concentrated to 20 ml and left standing overnight at −5° C. Crystals were filtered and dried to collect 0.72 g of dimethylsilylenebis[4,5,6,7-tetrahydroindenyl]zirconium dimethyl, component (A).

Preparation of Copolymer

Polymerization was conducted under the same conditions as in the preparation of the copolymer in Example 1 except that 0.42 mg of dimethylsilylenebis(tetrahydroindenyl)zirconium methyl and 3 mmol, as aluminum atoms, of methylisobutylalumoxane were used as catalyst components.

Thus was obtained 57.2 g of a polymer in a catalytic activity of 136,200 g polymer/g component (A) having the following properties.

MFR: 97 g/10 min.
Mn: 22.7 x 10³
Q: 3.52
Non-conjugated branched chain diene content: 1.7 mol % [mm]: 0.93
m.p.: 128° C.
X-Ray crystallinity: 30.7%

EXAMPLE 11

Preparation of Component (A)

Dimethylsilylenebis(2-methylindenyl)zirconium dichloride was prepared by the following procedure.

To a solution of 4.3 g (33 mmol) of 2-methylindene in 80 ml of tetrahydrofuran charged into a 500-ml glass reactor was slowly added dropwise, under cooling, 21 ml of a solution of 1.6 M n-butyllithium in hexane. The mixture was stirred at room temperature for 1 hour and cooled again. 2.1 g of dimethyldichlorosilane was slowly added dropwise and the mixture was stirred at room temperature for 12 hours. Then was added 50 ml of water and the organic phase was separated and dried to obtain 3.5 g of dimethylbis(2-methylindenyl)silane.

3.5 g of dimethylbis(2-methylindenyl)silane was dissolved in 70 ml of tetrahydrofuran and 13.9 ml of a solution of 1.6 M n-butyllithium in hexane was slowly added dropwise under cooling. The mixture was stirred at room temperature for 3 hours and slowly added dropwise to a solution of 2.6 g (11 mmol) of zirconium tetrachloride in 60 ml of tetrahydrofuran. After the resulting solution was stirred for 5 hours, gaseous hydrogen chloride was blown into the solution which was then dried. Subsequently, methylene chloride was added and the soluble portion was separated and crystallized at a low temperature to obtain 0.45 g of an orange powder.

The compound obtained was identified by ¹HNMR as dimethylsilylenebis(2-methylindenyl)zirconium dichloride with two unsymmetrical 2-methylindenyl groups.

Preparation of Copolymer

Polymerization was carried out under the same conditions as in the preparation of the copolymer in Example 1 except that 0.47 mg of dimethylsilylenebis(2-methylindenyl)zirconium dichloride and 3 mmol, as aluminum atoms, of methylisobutylalumoxane were used as catalyst components and that the polymerization temperature was 50° C.

Thus was obtained 42.6 g of a polymer in a catalytic activity of 90,600 g polymer/g component (A) having the following properties.

MFR: 1.7 g/10 min.
Mn: $11.4 \times 10^4$
Q: 3.16
Non-conjugated branched chain diene content: 1.3 mol %
[mm]: 0.912
m.p.: 12.4° C.
X-Ray crystallinity: 31.4%

What is claimed is:

1. A process for producing a propylene random copolymer which comprises contacting monomers with a polymerization catalyst, wherein said monomers comprise propylene and a non-conjugated branched diene represented by the formula: $CH_2=CH-(CH_2)_n-C(R_\alpha)=C(R_\beta)-(R_\gamma)$ and optionally an α-olefin represented by the formula: $CH_2=CH-C_mH_{2m+1}$, which provide the following repeating units (I)–(III) in quantities of 70–99.9 molar % of (I), 0–15 molar % of (II) and 0.1–30 molar % of (III), respectively, in admixture with the catalyst to give the random copolymer;

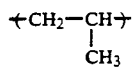 (I)

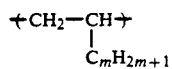 (II)

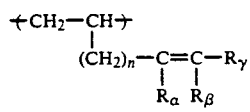 (III)

wherein m denotes 0 or an integer of 2–10, $R_\alpha$, $R_\beta$, $R_\gamma$ independently represent an hydrogen atom or a hydrocarbyl group having 1–5 carbon atoms, at least one of $R_\beta$ and $R_\gamma$ being the hydrocarbyl group, and n denotes an integer of 1–5, the polymerization catalyst comprising:

component (A) which is a transition metal compound represented by the formula:

wherein $(C_5H_{5-a-b}R^1{}_b)$ and $(C_5H_{5-a-c}R^2{}_c)$, respectively, represent a conjugated five-membered ring ligand coordinating to a metal Me, $R^1$ and $R^2$, respectively, represent a hydrocarbyl group having 1–20 carbon atoms, a halogen atom an alkoxy group, a silicon-containing hydrocarbyl group, a phosphorus-containing hydrocarbyl group, a nitrogen-containing hydrocarbyl group or a boron-containing hydrocarbyl group, wherein $R^1$ and $R^2$ or a boron containing hydrocarbyl group, wherein $R^1$ and $R^2$ may be the same or different, and a plurality of $R^1$ or of $R^2$ can be bonded to each other, Q represents a bonding group crosslinking the two conjugated five-membered ring ligands, Me represents a transition metal of groups IVB–VIB in the Periodic Table, X and Y, which may be the same or different, represent a hydrogen atom, a halogen atom, a hydrocarbyl group, an alkoxy group, an amino group, a phosphorus-containing hydrocarbyl group or a silicon containing hydrocarbyl group, respectively, a denotes 1, b denotes an integer in the range of $0 \leq b \leq 5$ and c denotes an integer in the range of $0 \leq c \leq 5$ wherein $0 \leq a+b \leq 5$ and $0 \leq a+c \leq 5$; and component (B) which is an alumoxane.

2. A process according to claim 1, wherein in the component (A), each of the conjugated five-membered ring ligand is selected from the group consisting of substituted or non-substituted cyclopentadienyl, indenyl and fluorenyl groups.

3. A process according to claim 2, wherein in the component (A), each of the conjugated five-membered ring ligand is a substituted or non-substituted cyclopentadienyl group.

4. A process according to claim 1, wherein in the component (A), and Q represents a crosslinking group selected from the group consisting of (i) an alkylene group which is methylene, ethylene or propylene which may or may not be substituted with a hydrocarbyl group having 1 to 8 carbon atoms and (ii) mono- and oligo-silylene groups which may or may not be substituted with a hydrocarbyl group having 1–8 carbon atoms.

5. A process according to claim 1, wherein the metal Me represents zirconium or hafnium.

6. A process according to claim 1, wherein in the component (A), X and Y represents a halogen atom or a hydrocarbyl group having 1–20 carbon atoms, respectively.

7. A process according to claim 1, wherein in the component (A), Q represents a crosslinking group selected from the group consisting of (i) an alkylene group which is methylene, ethylene or propylene which may or may not be substituted with a hydrocarbyl group having 1–8 carbon atoms and (ii) mono- and oligosilylene groups which may or may not be substituted with a hydrocarbyl group having 1–8 carbon atoms and Me represents a transition metal selected from the group consisting of zirconium and hafnium.

8. A process according to claim 1, wherein the alumoxane of the component (B) is an alkylalumoxane having 1–6 carbon atoms in the alkyl.

9. A process according to claim 8, wherein the alkylalumoxane has two types of an alkyl group.

10. A process according to claim 9, wherein the alkylalumoxane is a methylisobutylalumoxane.

11. A process according to claim 1, wherein the non-conjugated diene which affords the repeating unit of the formula (III) is selected from the group consisting of methyl-substituted 1,4-hexadiene and methyl-substituted 1,6-octadiene.

12. A process according to claim 1, wherein the α-olefin which affords the repeating unit of the formula (II) is a linear α-olefin.

13. A process according to claim 1, wherein the α-olefin which affords the repeating unit of the formula (II) is the one in which m denotes 0 or m denotes 2–4.

14. A process according to claim 1, wherein preliminary polymerization of propylene is conducted prior to the copolymerization at a temperature lower than the copolymerization of the olefins which afford the repeating units of the formulae (I)–(III) to produce homopolypropylene in an amount of 10% by weight or less to the total weight of the homopolypropylene and the copolymer produced in the subsequent copolymerization.

* * * * *